US008894229B2

(12) United States Patent
Kim et al.

(10) Patent No.: US 8,894,229 B2
(45) Date of Patent: Nov. 25, 2014

(54) BACKLIGHT ASSEMBLY AND A DISPLAY DEVICE HAVING THE SAME

(75) Inventors: Hyun-Jin Kim, Yongin-si (KR); Seok-Hyun Nam, Seoul (KR); Chi-O Cho, Asan-si (KR); Tae-Il Lee, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 803 days.

(21) Appl. No.: 12/551,144

(22) Filed: Aug. 31, 2009

(65) Prior Publication Data

US 2010/0053938 A1  Mar. 4, 2010

(30) Foreign Application Priority Data

Sep. 2, 2008 (KR) .................. 10-2008-0086276

(51) Int. Cl.
| *G09F 13/04* | (2006.01) |
| *H01J 5/62* | (2006.01) |
| *H01J 5/50* | (2006.01) |
| *G02F 1/1335* | (2006.01) |

(52) U.S. Cl.
CPC ... *H01J 5/50* (2013.01); *H01J 5/62* (2013.01); *G02F 1/133608* (2013.01); *G02F 1/133604* (2013.01)
USPC ............... 362/97.1; 362/97.2; 362/217.05; 362/219; 362/227; 362/260; 313/234; 313/594; 313/607

(58) Field of Classification Search
CPC .... F21Y 2103/00; F21V 23/02; H01J 65/046; H01J 65/00; H01J 61/547; H01J 61/54; H01J 61/544; H01J 1/90; H01J 7/44; H01J 61/56; G02F 1/133604; G02F 2201/12
USPC ........ 362/97.1, 97.2, 217.085, 219, 225, 227, 362/260, 217.05; 313/234, 594, 607
See application file for complete search history.

(56) References Cited

U.S. PATENT DOCUMENTS

| 3,974,418 | A | * | 8/1976 | Fridrich .......................... 315/59 |
| 4,317,069 | A | * | 2/1982 | Burgess ................... 315/227 R |
| 4,912,368 | A | * | 3/1990 | Nishiyama et al. ............. 315/58 |
| 6,104,598 | A | * | 8/2000 | Duva ............................. 361/303 |
| 6,661,181 | B2 | * | 12/2003 | Shin ........................ 315/169.4 |

(Continued)

FOREIGN PATENT DOCUMENTS

| JP | 10-177170 | 6/1998 |
| JP | 4049802 | 2/2008 |

(Continued)

OTHER PUBLICATIONS

Japanese Office Action dated Jul. 2, 2013 issued in corresponding Japanese Patent Appln. No. 2009-203038.

(Continued)

*Primary Examiner* — Mary McManmon
(74) *Attorney, Agent, or Firm* — F. Chau & Associates, LLC

(57) ABSTRACT

A backlight assembly comprising: a plurality of fluorescent lamps each including a lamp tube having a fluorescent layer, a discharge gas contained in the lamp tube, a first electrode disposed in the lamp tube, and a conductive terminal capacitively coupled to the first electrode; and a lamp socket which secures the plurality of fluorescent lamps.

22 Claims, 16 Drawing Sheets

(56) References Cited

U.S. PATENT DOCUMENTS

| | | | |
|---|---|---|---|
| 6,843,584 B2* | 1/2005 | Bang et al. | 362/97.1 |
| 7,042,167 B2* | 5/2006 | Park et al. | 315/229 |
| 7,502,009 B2* | 3/2009 | Kang et al. | 345/102 |
| 7,638,945 B2 | 12/2009 | Takata | |
| 7,859,613 B2* | 12/2010 | Kim | 349/65 |
| 7,952,281 B2 | 5/2011 | Takata | |
| 2004/0004441 A1* | 1/2004 | Yano | 315/169.1 |
| 2005/0099143 A1* | 5/2005 | Kohno | 315/312 |
| 2005/0265047 A1* | 12/2005 | Yun et al. | 362/611 |
| 2006/0061297 A1* | 3/2006 | Heckmann | 315/247 |
| 2006/0108953 A1* | 5/2006 | Adam et al. | 315/390 |
| 2006/0197424 A1* | 9/2006 | Takata | 313/306 |
| 2007/0097706 A1* | 5/2007 | Kim | 362/614 |
| 2007/0183149 A1* | 8/2007 | Ko et al. | 362/225 |
| 2008/0246418 A1* | 10/2008 | Zhang et al. | 315/307 |
| 2009/0268431 A1 | 10/2009 | Takata | |
| 2010/0066272 A1 | 3/2010 | Takata | |
| 2010/0084977 A1* | 4/2010 | Iwamoto | 315/59 |

FOREIGN PATENT DOCUMENTS

| | | |
|---|---|---|
| KR | 1020050060232 | 6/2005 |
| KR | 1020060001697 | 1/2006 |
| KR | 1020060131242 | 12/2006 |
| KR | 1020080055283 | 6/2008 |
| WO | 2006051698 | 5/2006 |
| WO | 2008004349 | 1/2008 |

OTHER PUBLICATIONS

English translation of Korean Office Action dated May 29, 2014 issued in corresponding Korean Patent Application No. 10-2008-0086276.

* cited by examiner

BACKLIGHT ASSEMBLY AND A DISPLAY DEVICE HAVING THE SAME

CROSS-REFERENCE TO RELATED APPLICATION

This application claims priority to Korean Patent Application No. 10-2008-0086276 filed on Sep. 2, 2008 in the Korean Intellectual Property Office, the disclosure of which is incorporated by reference herein in its entirety.

BACKGROUND OF THE INVENTION

1. Technical Field

The present invention relates to a backlight assembly and a display device having the same.

2. Discussion of the Related Art

A liquid crystal display (LCD) is one of most widely used flat panel displays. The LCD includes two substrates on which electrodes are formed, and a liquid crystal layer interposed between the two substrates. Voltages are applied to the electrodes to realign liquid crystal molecules of the liquid crystal layer and thereby control the amount of light that is transmitted through the liquid crystal layer.

LCDs consume low amounts of power. However, since LCDs are not self-emissive, they utilize a separate light source to irradiate light. Fluorescent lamps can be used for this purpose.

For example, fluorescent lamps may be included in a backlight assembly which supplies light that is passed through the liquid crystal layer. In addition to fluorescent lamps, the backlight assembly may include various optical sheets and a receptacle for receiving the optical sheets and fluorescent lamps.

An LCD configured in this manner may be classified as a direct-type LCD or an edge-type LCD, depending on the way the fluorescent lamps mounted in the backlight assembly are positioned. In the direct-type LCD, a balance board is used so that a deviation between voltages applied to the fluorescent lamps does not occur.

The balance board may be of the type that utilizes a transformer coil, or of the type that utilizes a capacitor. Since the balance board is a separate element including a coil or capacitor, not only is the number of steps in the LCD's assembly process increased, but the size of the LCD is increased as well. For example, if a balance board, which includes a plurality of capacitors connected in series to each fluorescent lamp, is mounted to a rear surface of a backlight assembly, the thickness of the LCD in which the backlight assembly is disposed is increased.

Accordingly, there is a need to remove a deviation between voltages applied to fluorescent lamps included in a backlight assembly, while reducing the thickness of an LCD.

SUMMARY OF THE INVENTION

According to an exemplary embodiment of the present invention, there is provided a backlight assembly including: a plurality of fluorescent lamps each including a lamp tube having a fluorescent layer, a discharge gas contained in the lamp tube, a first electrode disposed in the lamp tube, and a conductive terminal capacitively coupled to the first electrode, and a lamp socket which secures the plurality of fluorescent lamps.

The fluorescent lamp further includes a second electrode connected to the first electrode and surrounding an end portion of the lamp tube, wherein the second electrode and the conductive terminal are capacitively coupled to each other.

The fluorescent lamp further includes a capacitor disposed between the second electrode and the conductive terminal.

The fluorescent lamp further includes an insulator disposed between the conductive terminal and the second electrode.

The conductive terminal surrounds the insulator.

The fluorescent lamp further includes a capacitor disposed between the second electrode and the conductive terminal.

The conductive terminal is configured to be inserted into a connecting terminal of a lamp socket.

The conductive terminal surrounds an end portion of the lamp tube.

The fluorescent lamp further includes a capacitor connected between the first electrode and the conductive terminal.

The capacitor includes a multilayer ceramic capacitor.

The fluorescent lamp further includes a printed circuit board on which the capacitor is mounted, wherein the printed circuit board interconnects the capacitor and the first electrode.

The fluorescent lamp further includes a housing connected to the first electrode with the capacitor as a medium therebetween, and wherein the housing is additionally connected to the conductive terminal.

The conductive terminal is configured to be connected to a lamp socket to receive a drive voltage.

According to an exemplary embodiment of the present invention, there is provided a backlight assembly including: a plurality of fluorescent lamps, each lamp including a lamp tube having a fluorescent layer, a discharge gas contained in the lamp tube, a first electrode disposed in the lamp tube, and a conductive terminal capacitively coupled to the first electrode; and a lamp socket that secures the plurality of fluorescent lamps thereto.

The lamp socket secures both ends of each of the plurality of fluorescent lamps thereto and comprises first and second sockets for connecting the plurality of fluorescent lamps in parallel.

The conductive terminal surrounds an end portion of the lamp tube.

At least one of the lamps further includes a capacitor connected between the first electrode and the conductive terminal.

The at least one lamp further includes a printed circuit board on which the capacitor is mounted, wherein the printed circuit board interconnects the capacitor and the first electrode.

The backlight assembly further includes an aligning plate having a securing portion for securing the printed circuit board therein.

The printed circuit board is secured vertically with respect to a long axis of the at least one lamp.

According to an exemplary embodiment of the present invention, there is provided a display device including: a display panel which displays an image; a plurality of fluorescent lamps, each lamp including a lamp tube having a fluorescent layer, a discharge gas contained in the lamp tube, a first electrode disposed in the lamp tube, and a conductive terminal capacitively coupled to the first electrode; and a lamp socket which secures the plurality of fluorescent lamps thereto.

At least one of the lamps may further include a second electrode connected to the first electrode and surrounding an end portion of the lamp tube, wherein the second electrode and the conductive terminal are capacitively coupled to each other. The at least one lamp may further include a capacitor disposed between the second electrode and the conductive terminal. The at least one lamp may further include an insulator disposed between the conductive terminal and the second electrode. The conductive terminal may surround the insulator. The at least one lamp may further include a capacitor disposed between the second electrode and the conductive terminal. The conductive terminal may be inserted into a connecting terminal of the lamp socket. The conductive terminal may surround an end portion of the lamp tube. At least one of the lamps may further include a capacitor connected between the first electrode and the conductive terminal. The at least one lamp may further include a printed circuit board on which the capacitor is mounted, wherein the printed circuit board interconnects the capacitor and the first electrode. The at least one lamp may further include a housing connected to the first electrode with the capacitor as a medium therebetween, and the housing may be additionally connected to the conductive terminal. The conductive terminal may be connected to the lamp socket to receive a drive voltage.

BRIEF DESCRIPTION OF THE DRAWINGS

The above and other features of the present invention will become more apparent by describing in detail exemplary embodiments thereof with reference to the attached drawings, in which.

DETAILED DESCRIPTION OF EXEMPLARY EMBODIMENTS

The invention will now be described more fully hereinafter with reference to the accompanying drawings, in which exemplary embodiments of the present invention are illustrated. The invention may, however, be embodied in many different forms and should not be construed as limited to the embodiments set forth herein.

Figure 1:
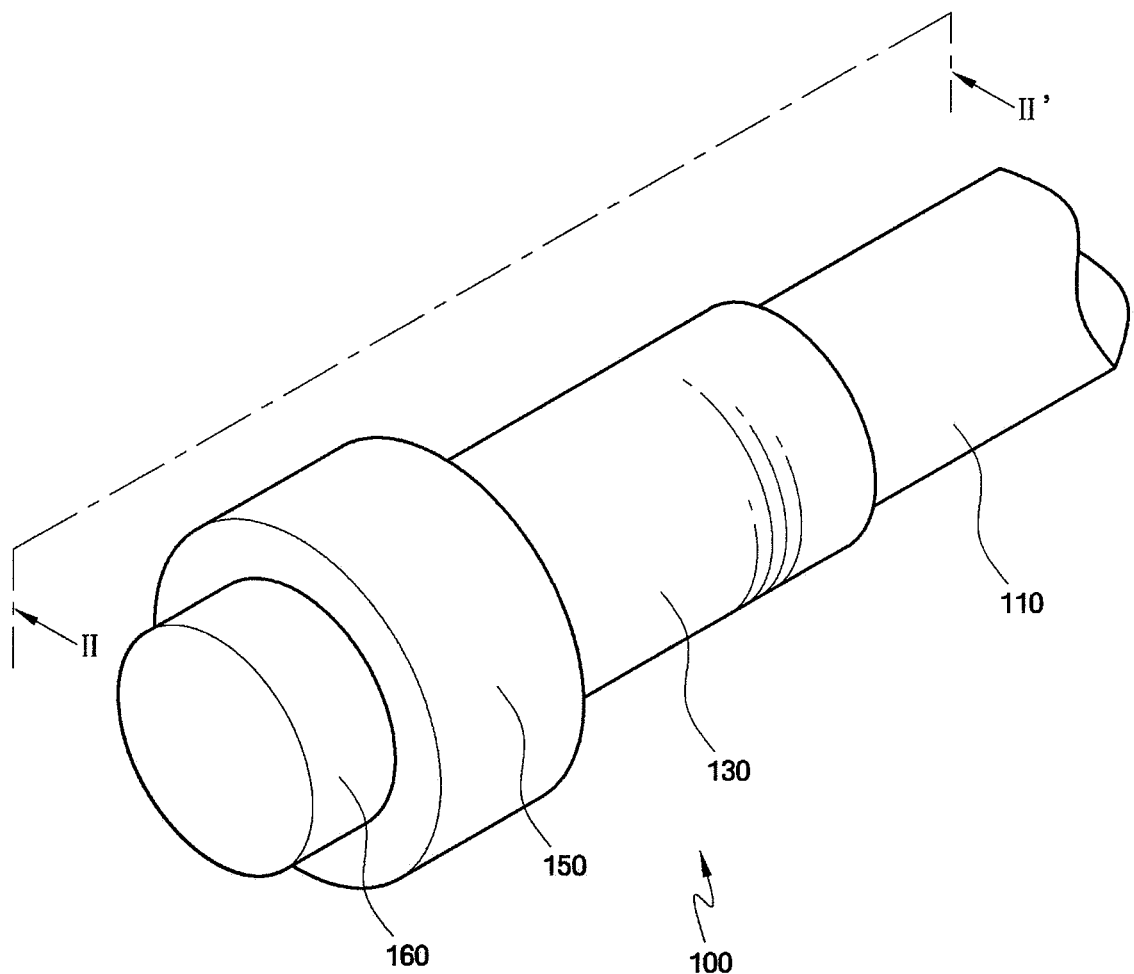
FIG. 1 is a partial perspective view of a fluorescent lamp according to an exemplary embodiment of the present invention.

A fluorescent lamp according to an exemplary embodiment of the present invention will hereinafter be described in detail with reference to FIGS. 1 to 3. FIG. 1 is a partial perspective view of a fluorescent lamp according to an exemplary embodiment of the present invention, FIG. 2 is a cross-sectional view of the fluorescent lamp taken along line II-II' of FIG. 1, and FIG. 3 is a perspective view of a lamp socket with ends of a plurality of fluorescent lamps connected thereto according to an exemplary embodiment of the present invention.

A fluorescent lamp 100 according to the present exemplary embodiment includes a lamp tube 110, a fluorescent layer 170, a first electrode 120, a lead wire 125, a second electrode 130, a capacitor 140, and a conductive terminal 160. It is to be noted that while some of the elements of the fluorescent lamp 100 are provided in pairs at both ends of the fluorescent lamp 100, only one of each of such elements will be described, in most instances, to simplify the description to follow.

The fluorescent lamp 100 receives a drive voltage from a power source and emits light, and may be a cold cathode fluorescent lamp (CCFL), a hot cathode fluorescent lamp (HCFL), or an external electrode fluorescent lamp (EEFL). Although the exemplary embodiments to follow are those in which the structures described correspond to a CCFL, the present invention is not limited in this regard. For example, various other types of fluorescent lamps, such as HCFLs and EEFLs, may be used in accordance with the exemplary embodiments to follow.

Figure 2:
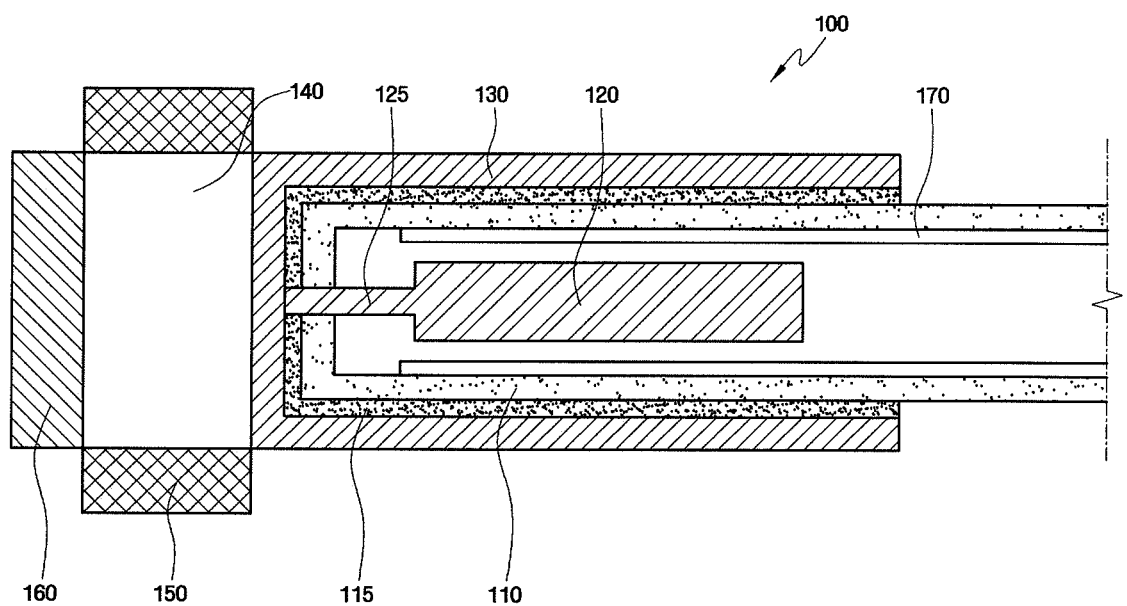
FIG. 2 is a cross-sectional view of the fluorescent lamp taken along line II-II' of FIG. 1.
Figure 3:
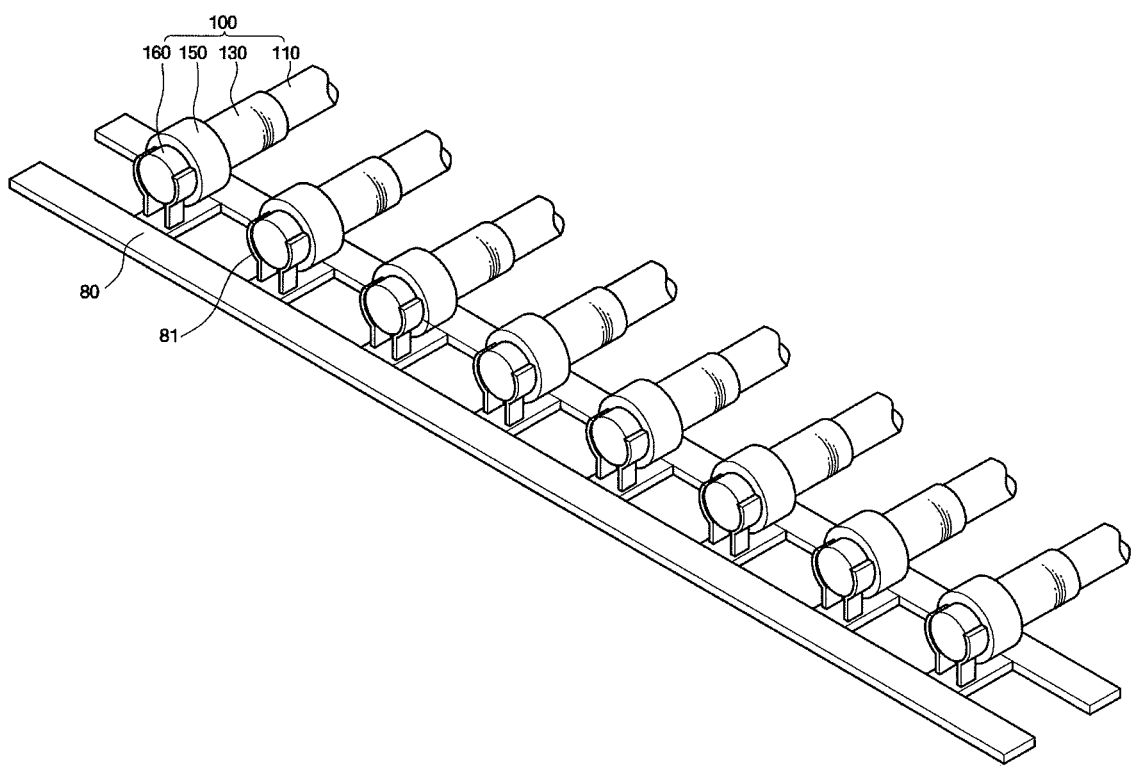
FIG. 3 is a perspective view of a lamp socket with ends of a plurality of fluorescent lamps connected thereto according to an exemplary embodiment of the present invention.

Referring first to FIGS. 1 and 2, the lamp tube 110 is formed in the shape of a hollow pipe. Further, the lamp tube 110 is made of a transparent material, such as glass, such that light produced in the lamp tube 110 can be emitted outwardly therefrom. A discharge gas for light emission of the fluorescent lamp 100 is injected into the lamp tube 110. For example, the discharge gas may be mercury (Hg), neon (Ne), xenon (Xe), or argon (Ar). Mercury (Hg) produces ultraviolet light through discharge. Neon (Ne), xenon (Xe), and argon (Ar) are ionized through discharge to produce secondary electrons such that the amount of ultraviolet light produced is increased, and reduce a level of a discharge voltage required for discharge through a Penning effect to thereby minimize electricity consumption.

The fluorescent layer 170 is deposited on the inner surface of the lamp tube 110, and is excited by ultraviolet light produced by the discharge gas to thereby emit visible light.

The first electrode 120 is inserted into the lamp tube 110. When a voltage is applied to the first electrode 120, the discharge gas present in the lamp tube 110 initiates a plasma discharge, such that ultraviolet light is emitted. The first electrode 120 may be formed of a metal, such as nickel (Ni), molybdenum (Mo), or niobium (Nb). One end of the first electrode 120 is connected to the lead wire 125, and the other end of the first electrode 120 extends toward the center of the lamp tube 110 opposing the first electrode 120 in the opposite end of the lamp tube 110. A metal having a low work function may be used as the metal for the first electrode 120. By using a metal with a low work function, discharge is possible utilizing a relatively low drive voltage.

One end of the lead wire 125 is connected to the first electrode 120, and the other end of the lead wire 125 is connected to the second electrode 130.

The second electrode 130 is in the form of a cap that surrounds one end of the lamp tube 110. The second electrode 130 is electrically connected to the first electrode 120, and is joined with the lamp tube 110 using a conductive adhesive 115. The conductive adhesive 115 is an adhesive that includes conductive particles, for example, a silver (Ag) paste that includes silver particles. The conductive adhesive 115 is deposited on the end of the lamp tube 110 to thereby be interposed between the lamp tube 110 and the second electrode 130. The conductive adhesive 115 is deposited between the lead wire 125 and the second electrode 130 to thereby electrically connect the first electrode 120 and the second electrode 130.

The second electrode 130 is capacitively coupled to the conductive terminal 160. For example, the capacitor 140 is interposed between the second electrode 130 and the conductive terminal 160. In such a structure, the second electrode 130 and the conductive terminal 160 function as the two terminals of the capacitor 140.

The conductive terminal 160 is connected to a lamp socket 80 to receive a drive voltage, and is capacitively coupled to the second electrode 130 as described above. By applying a drive voltage to the conductive terminal 160, a voltage is produced at the first electrode 120 disposed in the lamp tube 110.

The conductive terminal 160 opposes the second electrode 130 with the capacitor 140 as a medium therebetween, and is positioned at the outermost end of the fluorescent lamp 100. The conductive terminal 160 also functions to secure the fluorescent lamp 100 after being inserted into the lamp socket 80.

The capacitor 140 is interposed between the conductive terminal 160 and the second electrode 130 to thereby capacitively couple the conductive terminal 160 and the second electrode 130. As an example, the capacitor 140 may be a multilayer ceramic capacitor (MLCC). An MLCC is a small capacitor that utilizes a high dielectric ceramic in a multilayer structure as a dielectric between conductors.

An insulator 150 is formed between the conductive terminal 160 and the second electrode 130. Since the conductive terminal 160 and the second electrode 130 are capacitively coupled through the capacitor 140, the conductive terminal 160 and the second electrode 130 are not directly connected to each other. Accordingly, the insulator 150 functions to insulate the conductive terminal 160 and the second electrode 130 from each other. The insulator 150 may be ring-shaped and formed surrounding a part of the fluorescent lamp 100. For example, the insulator 150 may be formed surrounding the outer portion of the capacitor 140 to insulate the conductive terminal 160 and the second electrode 130 from each other.

By disposing the capacitor 140 on the end of the fluorescent lamp 100 in this manner, it is unnecessary to use a balance board (e.g., a separate circuit substrate that includes a balance circuit). To configure a balance board, electronic parts that are capable of forming high magnetic fields (e.g., coils) are mounted on a circuit substrate, and since such electronic parts affect the operation of the fluorescent lamp, a space is provided between each part and the fluorescent lamp. This can increase the thickness of a display device in which the fluorescent lamp is installed. Therefore, by making the balance board unnecessary, the thickness of the display device in which the fluorescent lamp 100 of the present exemplary embodiment is mounted may be reduced.

Referring to FIG. 3, the fluorescent lamp 100 is inserted into the lamp socket 80 to be secured therein. The lamp socket 80 functions to apply a drive voltage to the fluorescent lamp 100, as well as to secure the fluorescent lamp 100. As described above, the lamp socket 80 secures the conductive terminal 160 disposed on the end of the fluorescent lamp 100. In practice, the lamp socket 80 includes a pair of structures identical to the structure shown in FIG. 3 so that both ends of the fluorescent lamp 100 may be secured in this manner.

The lamp socket 80 includes a connecting terminal 81 into which the conductive terminal 160 is inserted. The connecting terminal 81 secures the conductive terminal 160 and applies a drive voltage thereto.

In an exemplary embodiment of the present invention, the lamp socket 80 includes a plurality connecting terminals 81, in which each connecting terminal 81 is electrically connected to an adjacent connecting terminal(s) 81. In such a configuration, the plurality of fluorescent lamps 100 inserted into the connecting terminals 81 are connected in parallel. In an exemplary embodiment of the present invention, the connecting terminals 81 are integrally formed with the lamp socket 80.

The lamp socket 80 structured in this manner may be connected to a lower receptacle (90 in FIG. 16) of a backlight assembly (10 in FIG. 16) which will be described later.

Figure 4:
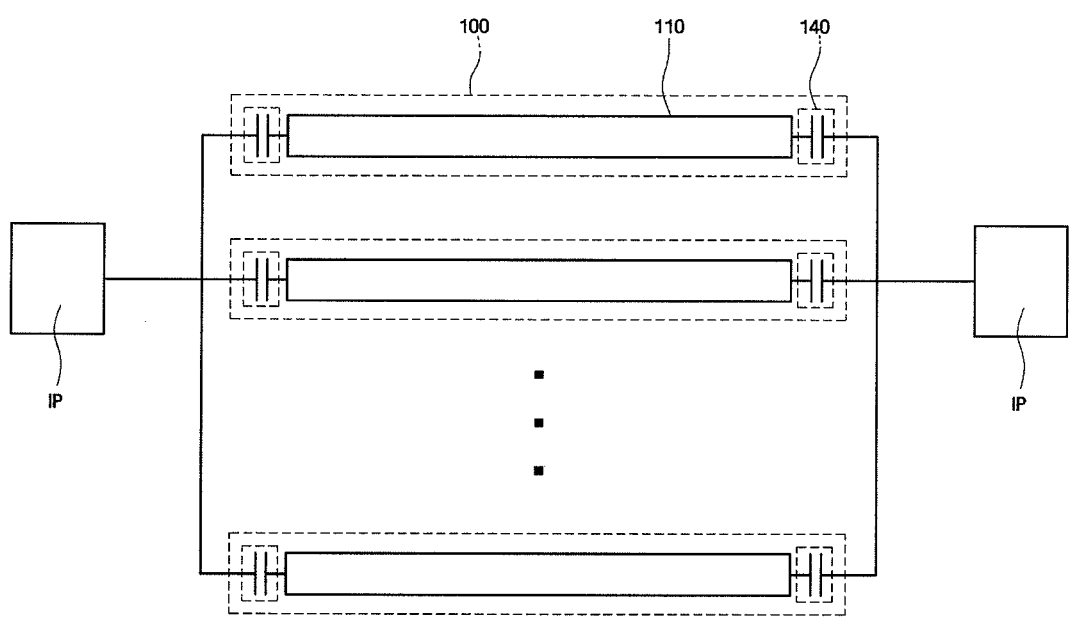
FIG. 4 is a schematic view of a plurality of the fluorescent lamps of FIG. 1 and a power supply unit according to an exemplary embodiment of the present invention.

Driving of the fluorescent lamp 100 will hereinafter be described with reference to FIG. 4. FIG. 4 is a schematic view of a plurality of the fluorescent lamps 100 of FIG. 1 and a power supply unit according to an exemplary embodiment of the present invention.

The capacitors 140 on the two ends of the fluorescent lamp 100 are connected in series. For each of the fluorescent lamps 100, one capacitor 140 is disposed on each end of the lamp tube 110, and each capacitor 140 is connected to a power supply unit IP. In other words, the fluorescent lamp 100 receives a voltage applied through the capacitors 140, and the applied voltage is used to excite the discharge gas in the lamp tube 110 such that visible light is emitted from the fluorescent lamp 100.

Each fluorescent lamp 100 directly receives a drive voltage from the power supply unit IP, which may be an inverter. In other words, power from the inverter is directly applied to the fluorescent lamp 100 without passing through a separate balance board. Through such a technique, the structure of a display device is simplified by minimizing the number of its parts and reducing its size.

Each fluorescent lamp 100 is connected in parallel with an adjacent fluorescent lamp(s) 100. The same voltage is applied to the plurality of parallel-connected fluorescent lamps 100, and with the formation of one capacitor 140 on each end of each of the fluorescent lamps 100, a deviation between voltages applied to the plurality of fluorescent lamps 100 does not occur. In other words, the capacitors 140 formed on each fluorescent lamp 100 function to remove a voltage deviation between adjacent fluorescent lamp(s) 100.

Figure 5:
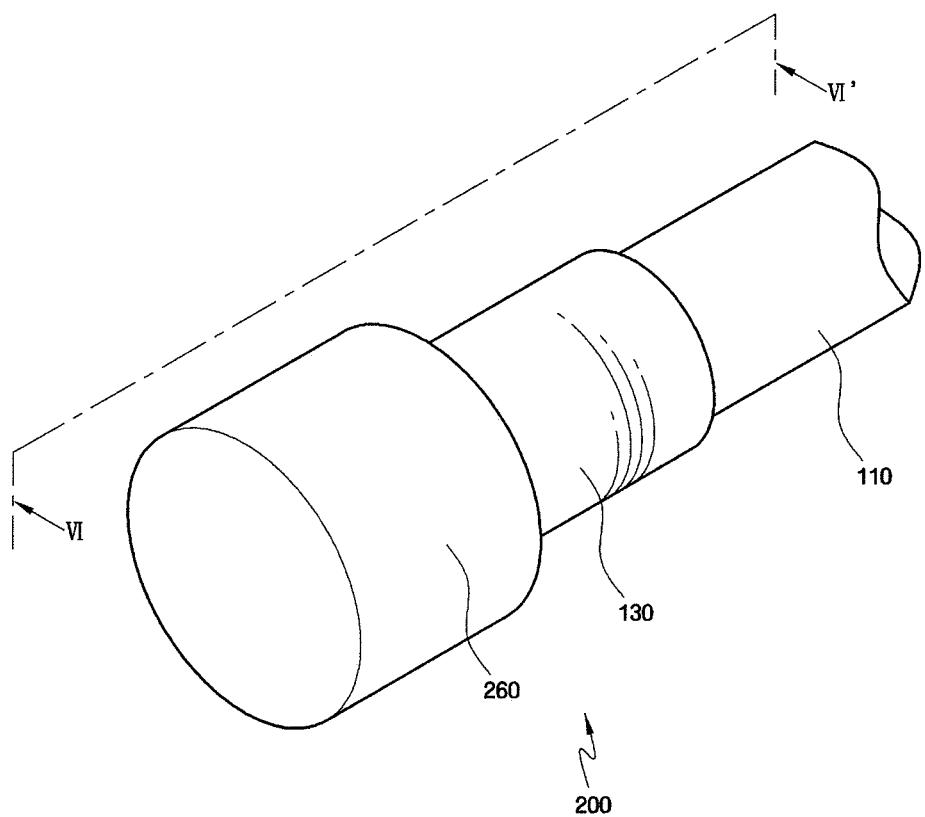
FIG. 5 is a partial perspective view of a fluorescent lamp according to an exemplary embodiment of the present invention.
Figure 6:
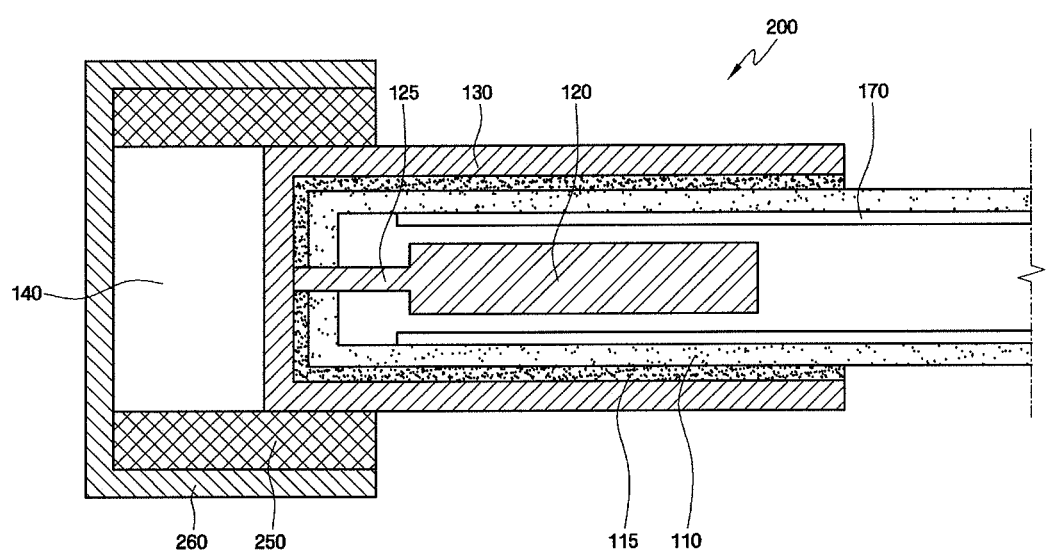
FIG. 6 is a cross-sectional view of the fluorescent lamp taken along line VI-VI' of FIG. 5.
Figure 7:
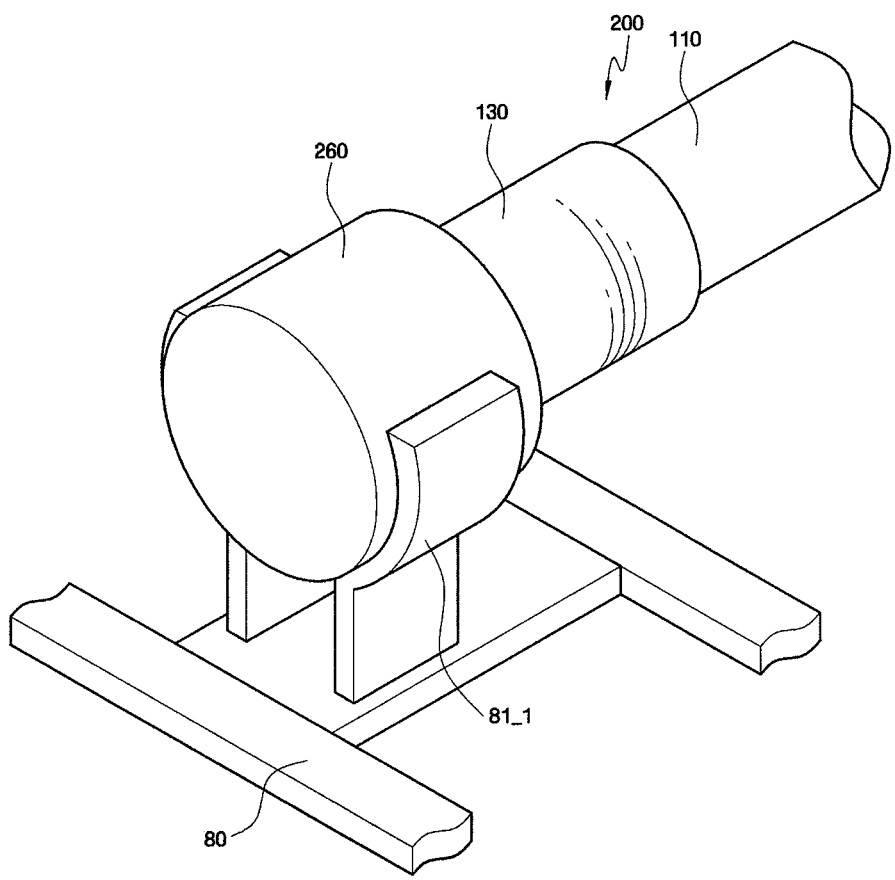
FIG. 7 is a partial perspective view of the fluorescent lamp of FIG. 5 and a lamp socket according to an exemplary embodiment of the present invention.

A fluorescent lamp according to an exemplary embodiment of the present invention will hereinafter be described in detail with reference to FIGS. 5 to 7. FIG. 5 is a partial perspective view of a fluorescent lamp according to an exemplary embodiment of the present invention, FIG. 6 is a cross-sectional view of the fluorescent lamp taken along line VI-VI' of FIG. 5, and FIG. 7 is a partial perspective view of the fluorescent lamp of FIG. 5 and a lamp socket according to an exemplary embodiment of the present invention. In FIGS.

5-7, the same reference numerals denote the same elements in FIGS. 1-3, and thus a description of such elements will not be provided.

A fluorescent lamp 200 according to the present exemplary embodiment includes a conductive terminal 260 formed surrounding the end of the lamp tube 110. The conductive terminal 260 is inserted into a connecting terminal 81_1 of the lamp socket 80.

In the present exemplary embodiment, it is to be noted that while some of the elements of the fluorescent lamp 200 are provided in pairs at both ends of the fluorescent lamp 200, only one of each of such elements will be described, in most instances, to simplify the description to follow.

The first electrode 120 is inserted into the lamp tube 110. By applying a voltage to the first electrode 120, the discharge gas initiates a plasma discharge.

One end of the lead wire 125 is connected to the first electrode 120, and the other end thereof is connected to the second electrode 130.

The second electrode 130 is in the form of a cap that surrounds one of the ends of the lamp tube 110. The second electrode 130 is electrically connected to the first electrode 120, and is joined with the lamp tube 110 using a conductive adhesive 115.

The second electrode 130 is capacitively coupled to the conductive terminal 260. For example, the capacitor 140 is interposed between the second electrode 130 and the conductive terminal 260. In such a structure, the second electrode 130 and the conductive terminal 260 function as the two terminals of the capacitor 140.

The conductive terminal 260 is connected to the lamp socket 80 to receive a drive voltage, and is capacitively coupled to the second electrode 130 as described above. By applying a drive voltage to the conductive terminal 260, a voltage is produced at the first electrode 120 disposed in the lamp tube 110. A voltage is similarly applied to the first electrode 120 on the other end of the lamp tube 110 through the corresponding conductive terminal 260.

The conductive terminal 260 opposes the second electrode 130 with the capacitor 140 as a medium therebetween, and is positioned at the outermost end of the fluorescent lamp 200. The conductive terminal 260 also functions to secure the fluorescent lamp 200 after the conductive terminal 260 is inserted into the lamp socket 80.

The conductive terminal 260 is formed surrounding the end of the fluorescent lamp 200. For example, the conductive terminal 260 is formed as a cap surrounding the capacitor 140, part of the second electrode 130, and part of the lamp tube 110.

An insulator 250 is interposed between the conductive terminal 260 and the second electrode 130. Since the conductive terminal 260 is formed as a cap surrounding the capacitor 140 and indirectly overlapping a portion of the second electrode 130, the insulator 250 is provided to insulate the second electrode 130 from the conductive terminal 260.

The insulator 250 may be ring-shaped and formed surrounding the capacitor 140 and part of the second electrode 130. The conductive terminal 260 may be formed surrounding an outer portion of the insulator 250.

The conductive terminal 260 is formed in a shape that allows for capping of the capacitor 140 and part of the second electrode 130, such that the overall length of the fluorescent lamp 200 may be reduced.

Further, since the conductive terminal 260 overlaps part of the second electrode 130 with the insulator 250 interposed therebetween, the conductive terminal 260 and the second terminal 130 function as an additional capacitor that is connected in parallel with the capacitor 140.

Figure 8:
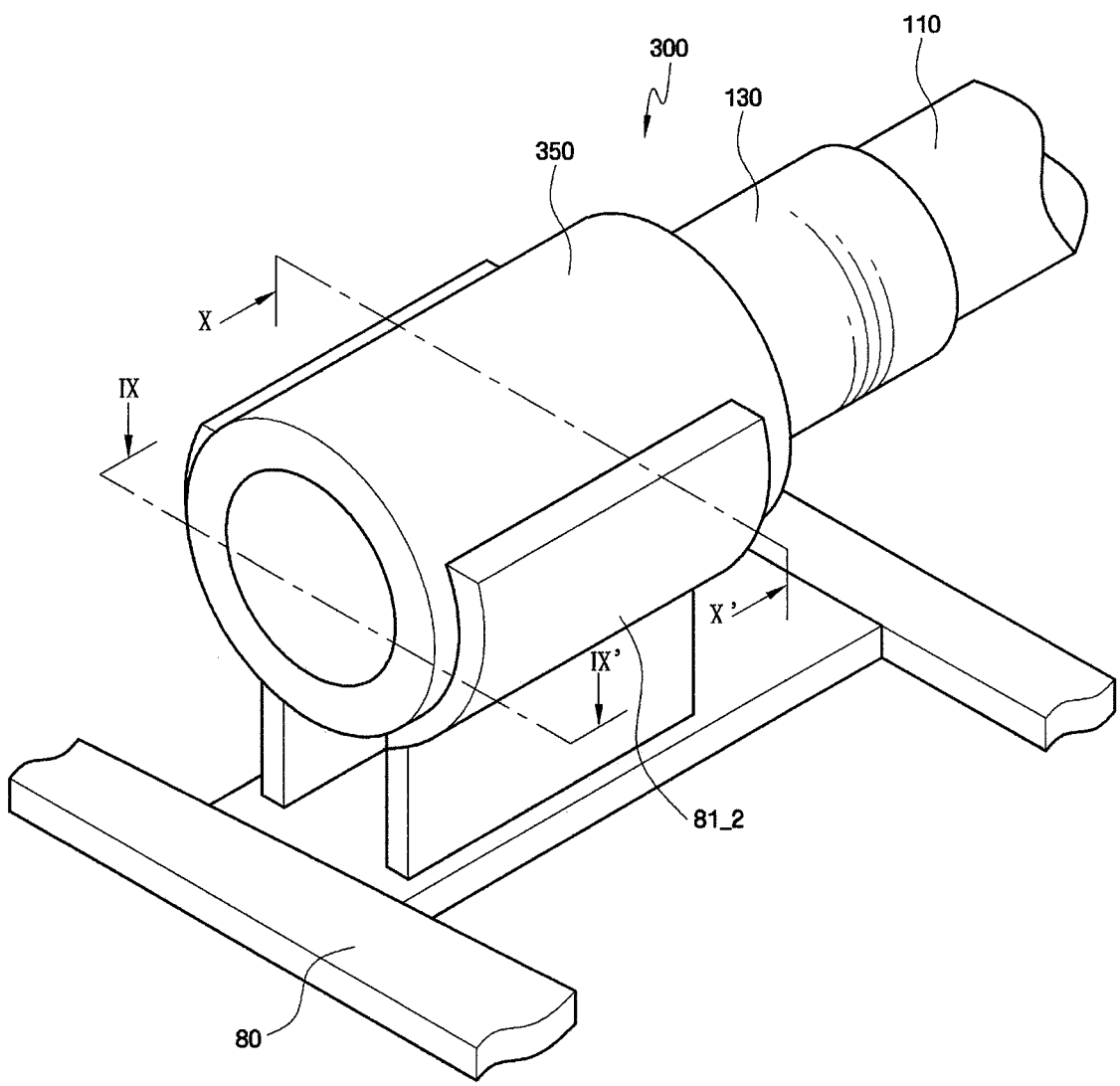
FIG. 8 is a partial perspective view of a fluorescent lamp and a lamp socket according to an exemplary embodiment of the present invention.
Figure 9:
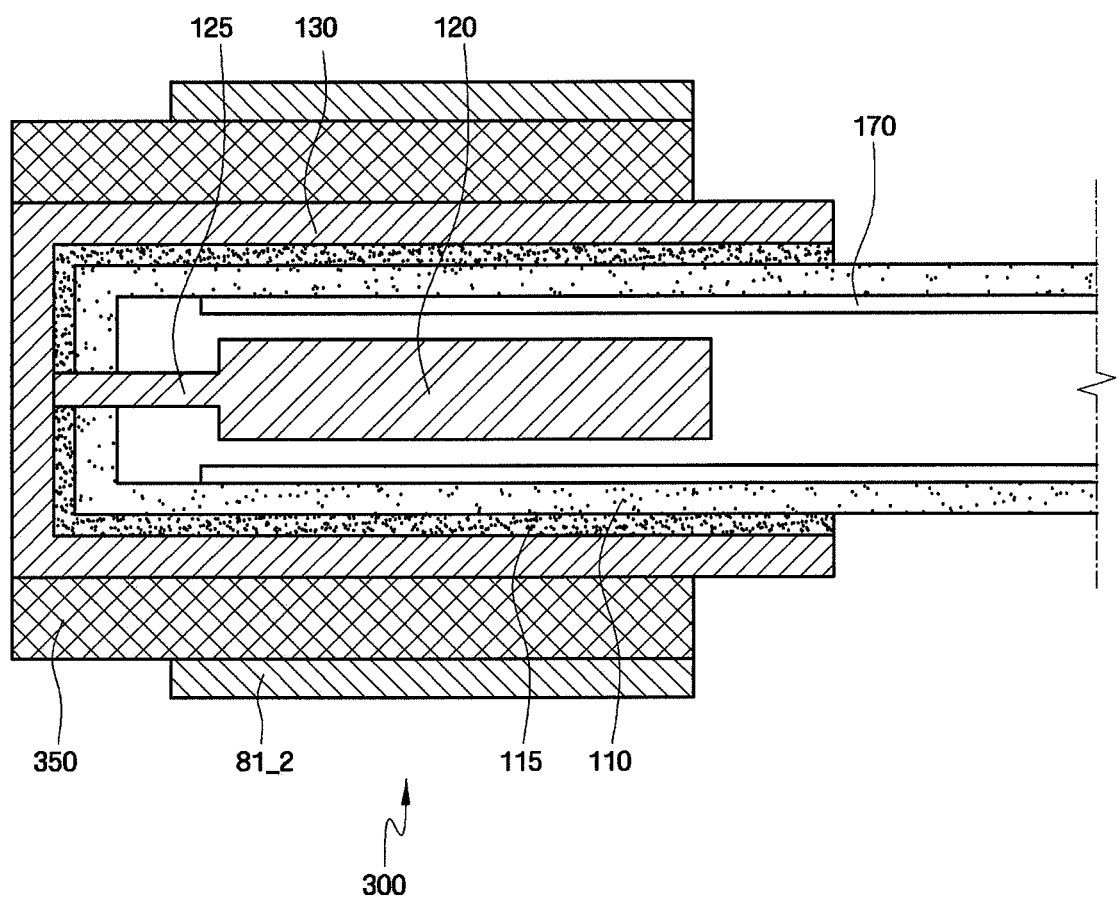
FIG. 9 is a cross-sectional view of the fluorescent lamp and lamp socket taken along line IX-IX' of FIG. 8.
Figure 10:
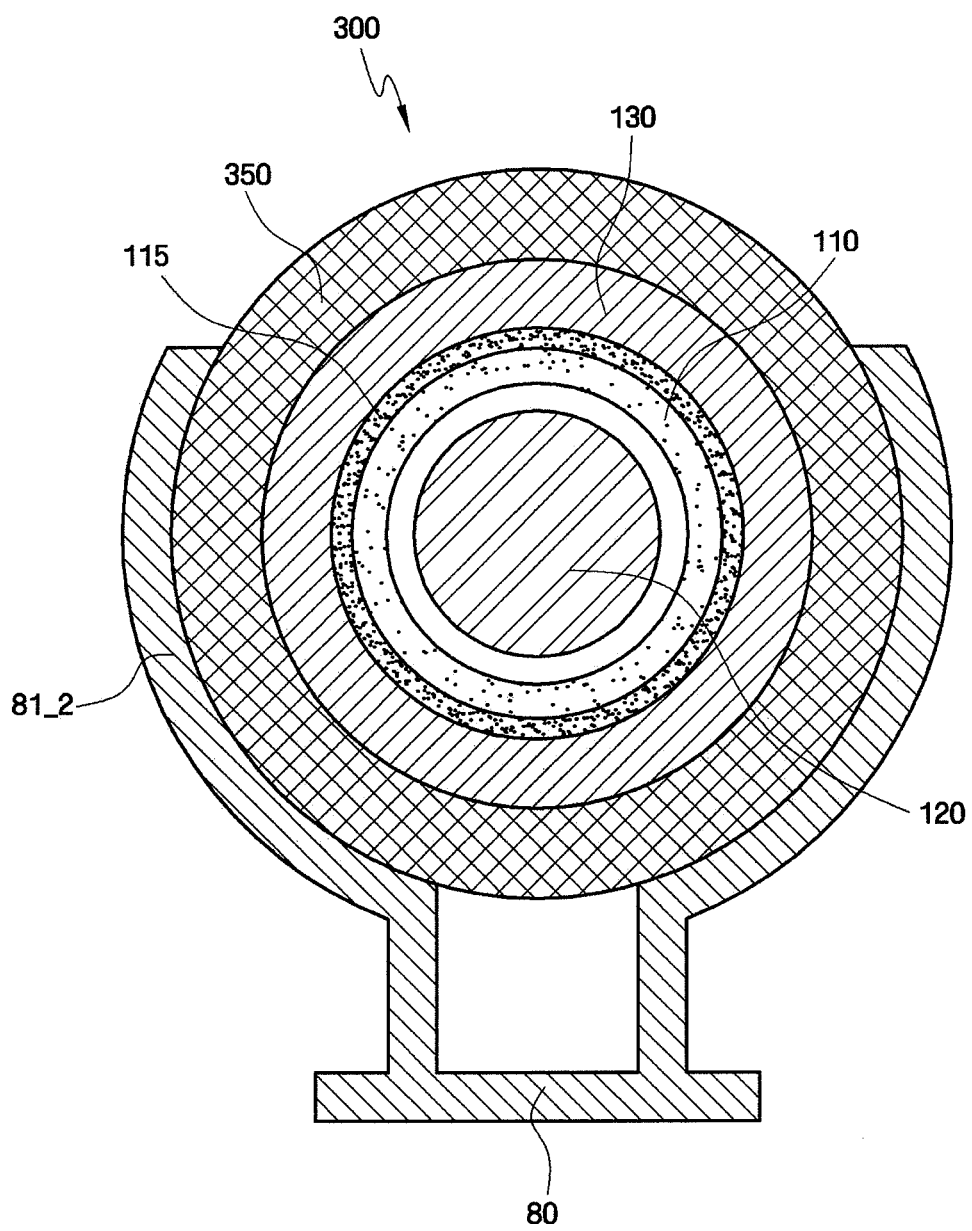
FIG. 10 is a cross-sectional view of the fluorescent lamp and lamp socket taken along line X-X' of FIG. 8.

A fluorescent lamp according to an exemplary embodiment of the present invention will hereinafter be described in detail with reference to FIGS. 8 to 10. FIG. 8 is a partial perspective view of a fluorescent lamp and a lamp socket according to an exemplary embodiment of the present invention, FIG. 9 is a cross-sectional view of the fluorescent lamp and lamp socket taken along line IX-IX' of FIG. 8, and FIG. 10 is a cross-sectional view of the fluorescent lamp and lamp socket taken along line X-X' of FIG. 8. In FIGS. 8-10, the same reference numerals denote the same elements in FIGS. 1-3, and thus a description of such elements will not be provided.

A fluorescent lamp 300 according to the present exemplary embodiment includes an insulator 350 surrounding the outer portion of the second electrode 130. The insulator 350 is inserted into a connecting terminal 81_2 of the lamp socket 80. The second electrode 130 and the connecting terminal 81_2 form a capacitor.

In the present exemplary embodiment, it is to be noted that while some of the elements of the fluorescent lamp 300 are provided in pairs at both ends of the fluorescent lamp 300, only one of each of such elements will be described, in most instances, to simplify the description to follow.

The first electrode 120 is inserted into the lamp tube 110. By applying a voltage to the first electrode 120, the discharge gas initiates a plasma discharge.

One end of the lead wire 125 is connected to the first electrode 120, and the other end thereof is connected to the second electrode 130.

The second electrode 130 is in the form of a cap that surrounds one of the ends of the lamp tube 110. The second electrode 130 is electrically connected to the first electrode 120, and is joined with the lamp tube 110 using a conductive adhesive 115.

The insulator 350 is formed on the outer portion of the second electrode 130. The insulator 350 is formed surrounding the second electrode 130, and functions to absorb shock when inserted into the lamp socket 80. The insulator 350 is made of a flexible material to thereby minimize damage to the fluorescent lamp 300 during the process of inserting the fluorescent lamp 300 in the lamp socket 80.

The insulator 350 surrounds the second electrode 130 in a cylindrical shape, and the length and thickness of the cylindrical insulator 350 may be adjusted, depending on a required capacitance of the resulting capacitor.

The insulator 350 is inserted into the connecting terminal 81_2 of the lamp socket 80. The connecting terminal 81_2 opposes the second electrode 130 with the insulator 350 interposed therebetween. In this manner, the connecting terminal 81_2 and the second electrode 130 are capacitively coupled.

As a result of the capacitive coupling between the connecting terminal 81_2 and the second electrode 130, a configuration is achieved in which capacitors on both ends of the fluorescent lamp 300 are connected in series. The capacitance of each of the capacitors formed in this manner may be varied depending on the amount of overlapping between the connecting terminal 81_2 and the second electrode 130, as well as the permittivity and thickness of the insulator 350.

Figure 11:
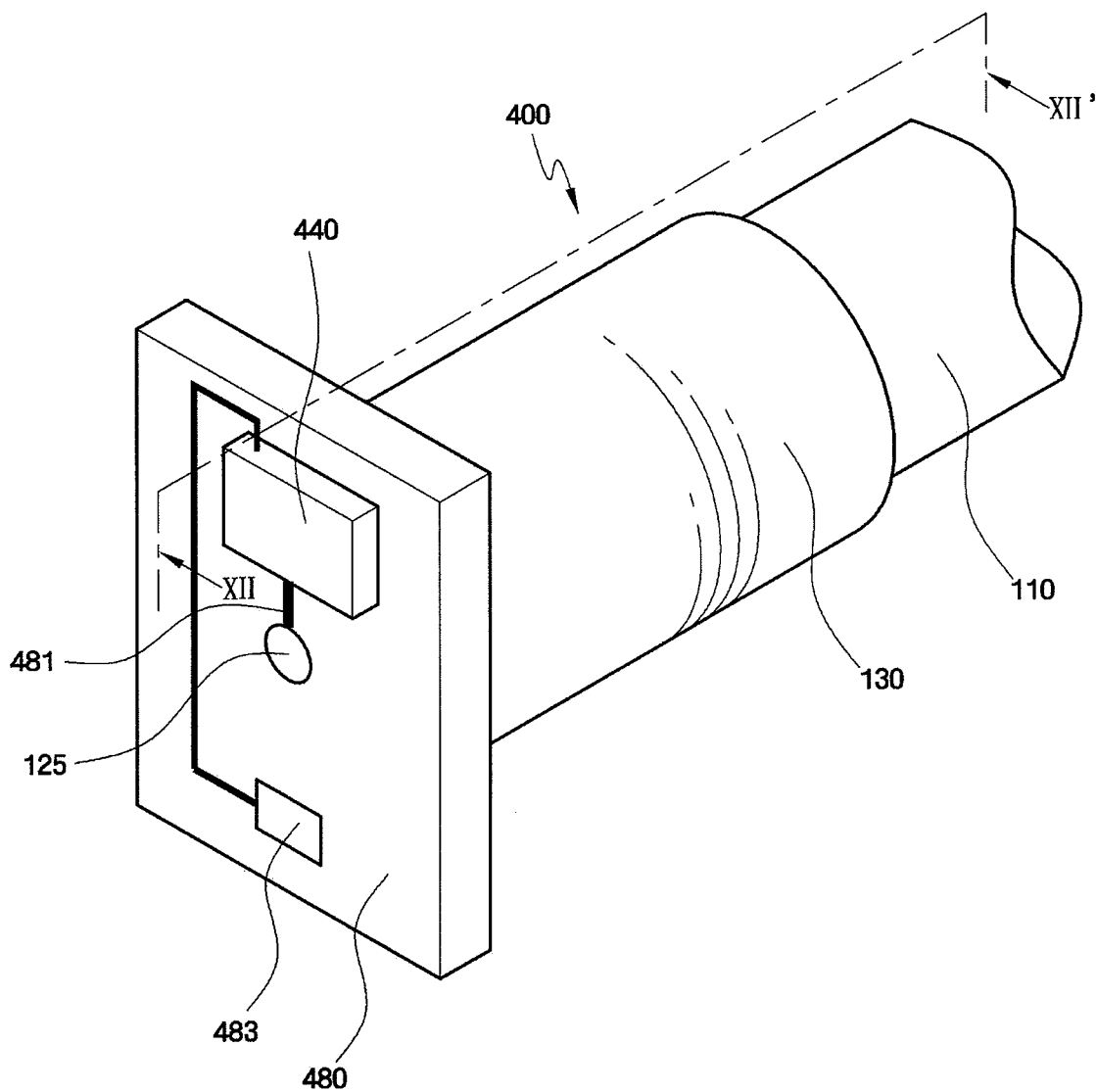
FIG. 11 is a partial perspective view of a fluorescent lamp according to an exemplary embodiment of the present invention.
Figure 12:
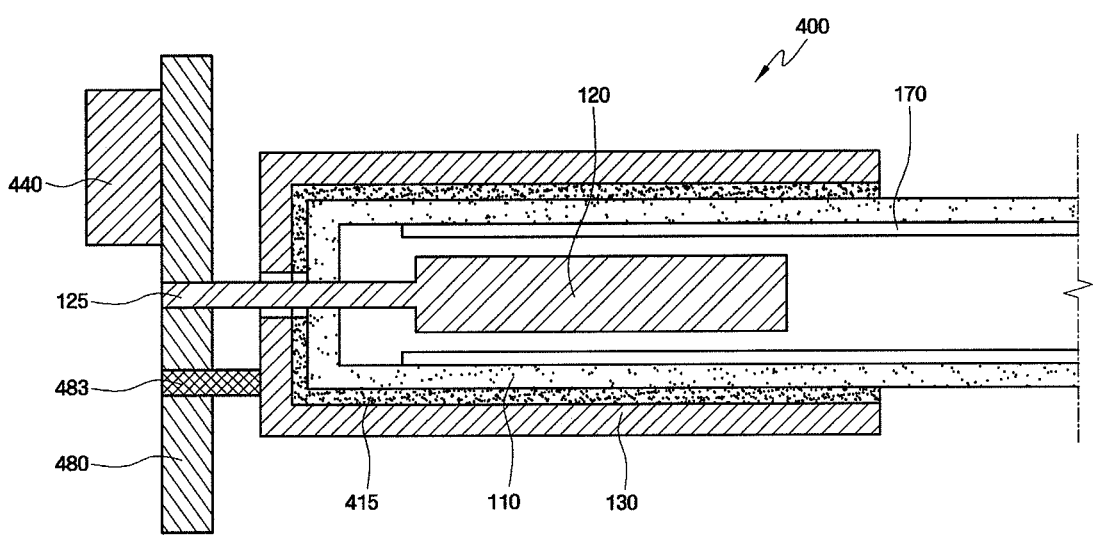
FIG. 12 is a cross-sectional view of the fluorescent lamp taken along line XII-XII' of FIG. 11.
Figure 13:
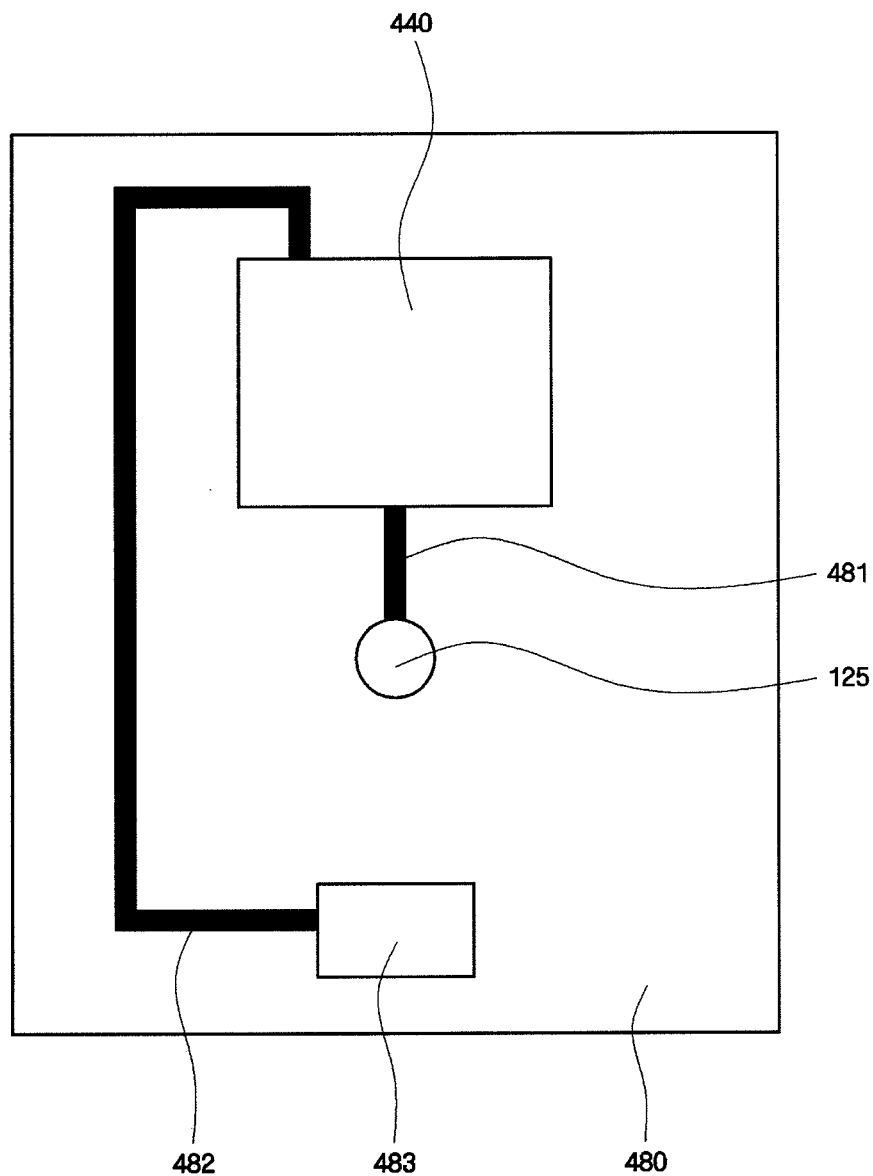
FIG. 13 is a plan view of a circuit substrate included in the fluorescent lamp of FIG. 11 according to an exemplary embodiment of the present invention.
Figure 14:
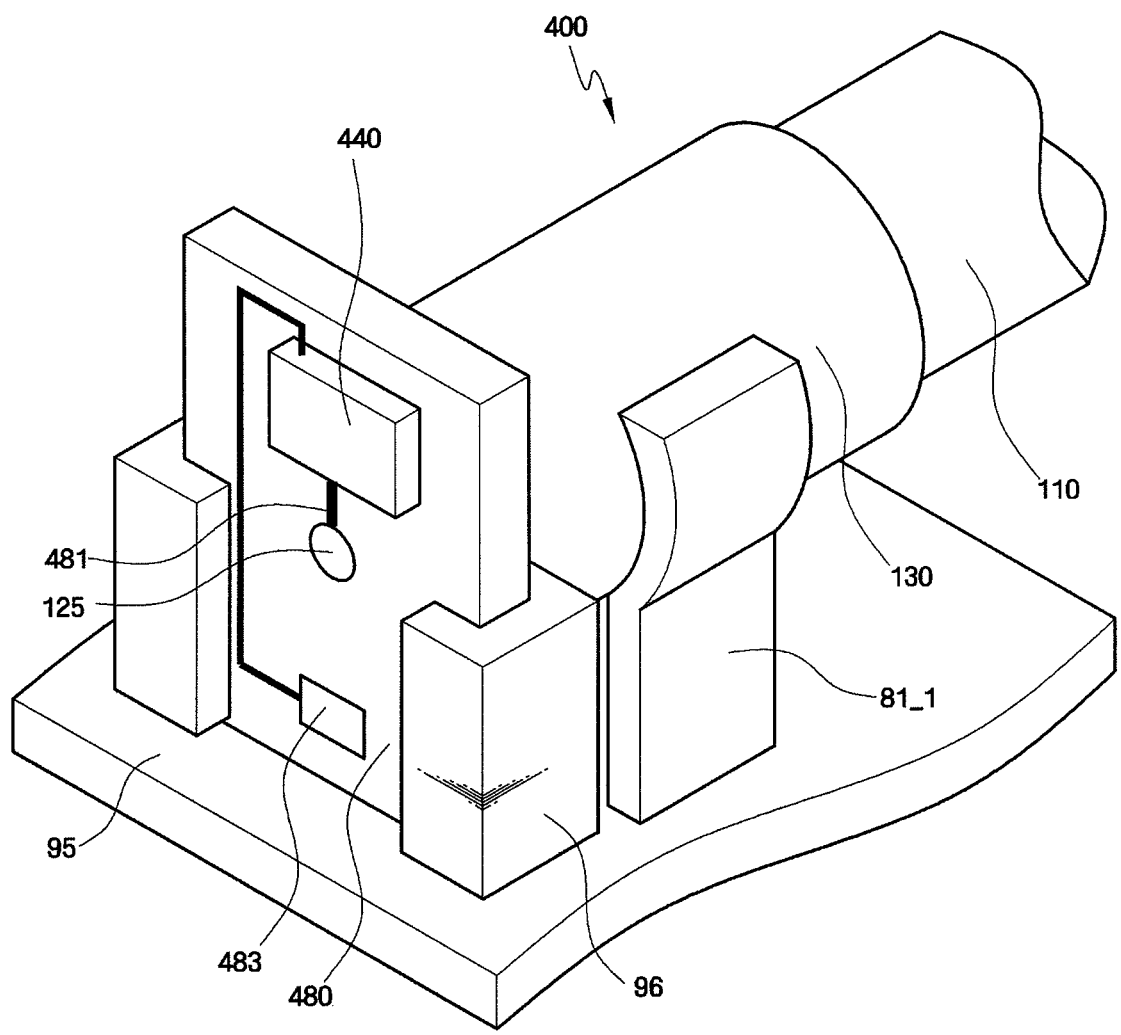
FIG. 14 is a partial perspective view of an aligning plate and the fluorescent lamp of FIG. 11 according to an exemplary embodiment of the present invention.

A fluorescent lamp according to an exemplary embodiment of the present invention will hereinafter be described in detail with reference to FIGS. 11 to 14. FIG. 11 is a partial perspective view of a fluorescent lamp according to an exemplary embodiment of the present invention, FIG. 12 is a cross-sectional view of the fluorescent lamp taken along line XII-XII' of FIG. 11, FIG. 13 is a plan view of a circuit substrate included in the fluorescent lamp of FIG. 11 according to an exemplary embodiment of the present invention, and FIG. 14 is a partial perspective view of an aligning plate and the fluorescent lamp of FIG. 11 according to an exemplary embodiment of the present invention.

In the present exemplary embodiment, the second electrode 130 may be a conductive terminal.

In a fluorescent lamp 400 according to the present exemplary embodiment, the first electrode 120 is connected to the second electrode 130 through a printed circuit board 480 on which a capacitor 440 is mounted.

In the present exemplary embodiment, it is to be noted that while some of the elements of the fluorescent lamp 400 are provided in pairs at both ends of the fluorescent lamp 400, only one of each of such elements will be described, in most instances, to simplify the description to follow.

The first electrode 120 is inserted into the lamp tube 110. By applying a voltage to the first electrode 120, the discharge gas initiates a plasma discharge.

One end of the lead wire 125 is connected to the first electrode 120, and the other end thereof is connected to the printed circuit board 480.

The second electrode 130 is in the form of a cap that surrounds one of the ends of the lamp tube 110. The second electrode 130 is joined with the lamp tube 110 using an adhesive 415. The adhesive 415 may be an insulative adhesive, such that the lead wire 125, which is connected to the first electrode 120, and the second electrode 130 are not directly connected to each other. However, a conductive adhesive may also be used as the adhesive 415, in which case the area of application of the adhesive 415 is controlled such that the second electrode 130 and the lead wire 125 are not connected to each other.

The lead wire 125 is connected to the first electrode 120 and extends outwardly from the lamp tube 110. The lead wire 125 passes through the second electrode 130 without being connected to the same. Further, the lead wire 125 is inserted into the printed circuit board 480 and is connected to a first wire 481. The first wire 481 may be a wire printed on the printed circuit board 480, and is connected to one terminal of the capacitor 440.

As described above, the capacitor 440 is mounted on the printed circuit board 480. The capacitor 440 may be an MLCC, which is small and may be designed having a large capacitance. One terminal of the capacitor 440 is connected to the first wire 481, as described above, and the other terminal thereof is connected to a second wire 482. The second wire 482 is a wire printed on the printed circuit board 480, and interconnects the capacitor 440 and a connecting electrode 483.

The connecting electrode 483 passes through the printed circuit board 440 to electrically interconnect the second wire 482 and the second electrode 130. The connecting electrode 483 is formed so that it is strong enough to provide structural support between the printed circuit board 480 and the second electrode 130. In other words, the connecting electrode 483 cooperates with the lead wire 125 such that the printed circuit board 480 and the second electrode 130 may be mechanically connected to each other with sufficient strength.

The second electrode 130 is connected to a lamp socket (not shown) to receive a drive voltage. In greater detail, when the second electrode 130 is connected to a lamp socket (not shown) to receive a drive voltage, the second electrode 130 is capacitively coupled to the first electrode 120 through the capacitor 440 mounted on the printed circuit board 480. Accordingly, in the fluorescent lamp 400, the capacitors 440 are connected in series between the lamp socket (not shown) and the first electrodes 120, such that there is no deviation between voltages applied to the fluorescent lamp(s) adjacent to the fluorescent lamp 400.

Referring to FIG. 14, the fluorescent lamp 400 is aligned by an aligning plate 95 and secured in a receptacle (not shown). The aligning plate 95 includes a securing portion 96 for securing the printed circuit board 480. The securing portion 96 is formed with a groove to allow for insertion of the printed circuit board 480. The securing portion 96 may be formed integrally with the aligning plate 95, and may be made of an insulating material.

The printed circuit board 480 is vertically inserted into the securing portion 96. As a result, separate circuit parts do not protrude outwardly from the lower receptacle (90 in FIG. 16), such that the thickness of a display device (1 in FIG. 16) may be reduced.

In the present exemplary embodiment, one of the printed circuit boards 480 is disposed on each end of each fluorescent lamp 400. However, in an exemplary embodiment of the present invention, one end of all the fluorescent lamps may be connected to a single printed circuit board.

The aligning plate 95 includes a connecting terminal 81_1. The connecting terminal 81_1 may be formed integrally with or insulated from the aligning plate 95.

Figure 15:
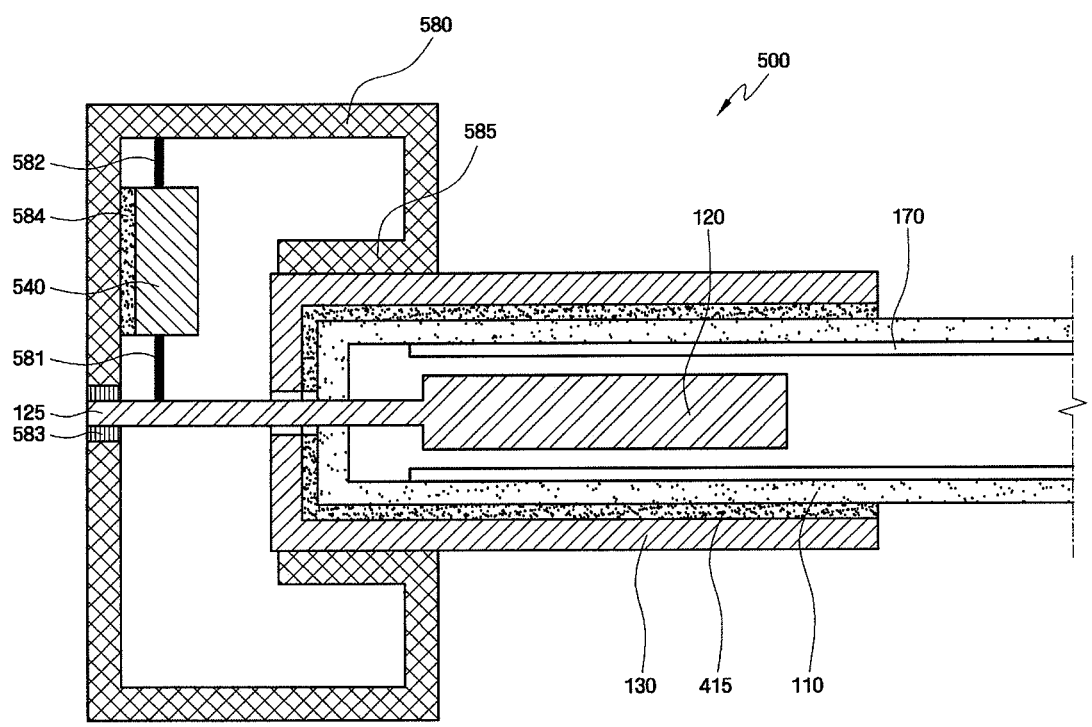
FIG. 15 is a partial cross-sectional view of a fluorescent lamp according to an exemplary embodiment of the present invention.

A fluorescent lamp according to an exemplary embodiment of the present invention will hereinafter be described in detail with reference to FIG. 15. FIG. 15 is a partial cross-sectional view of a fluorescent lamp according to an exemplary embodiment of the present invention. To simplify the description to follow, the same reference numerals denote the same elements in FIGS. 11-14, and thus a description of such elements will not be provided.

In the present exemplary embodiment, the second electrode 130 may be a conductive terminal.

In a fluorescent lamp 500 according to the present exemplary embodiment, the first electrode 120 is connected to the second electrode 130 through a housing 580 in which a capacitor 540 is mounted.

In the present exemplary embodiment, it is to be noted that while some of the elements of the fluorescent lamp 500 are provided in pairs at both ends of the fluorescent lamp 500, only one of each of such elements will be described, in most instances, to simplify the description to follow.

The first electrode 120 is inserted into the lamp tube 110. By applying a voltage to the first electrode 120, the discharge gas initiates a plasma discharge.

One end of the lead wire 125 is connected to the first electrode 120, and the other end thereof is connected to the housing 580.

The second electrode 130 is in the form of a cap that surrounds one of the ends of the lamp tube 110. The second electrode 130 is joined with the lamp tube 110 using an adhesive 415. The adhesive 415 may be an insulative adhesive, such that the lead wire 125, which is connected to the first electrode 120, and the second electrode 130 are not directly connected to each other. However, a conductive adhesive may also be used as the adhesive 415, in which case the area of application of the adhesive 415 is controlled such that the second electrode 130 and the lead wire 125 are not connected to each other.

The lead wire 125 is connected to the first electrode 120 and extends outwardly from the lamp tube 110. The lead wire 125 passes through the second electrode 130 without being connected to the same. Further, the lead wire 125 may be insulated by an insulating element 583 such that the lead wire 125 is not electrically connected to the housing 580. The lead wire 125 is connected to one terminal of the capacitor 540 through a first wire 581.

The capacitor 540 is mounted in the housing 580, as described above. To insulate the capacitor 540 from the housing 580, the capacitor 540 may be adhered to an inner portion of the housing 580 using an insulative adhesive 584. One terminal of the capacitor 540 is connected to the first wire 581, and the other terminal thereof is connected to a second wire 582. The second wire 582 electrically interconnects the other terminal of the capacitor 540 and the housing 580.

In the present exemplary embodiment, the housing 580 is formed of a conductive material, and is formed capping the end portion of the second electrode 130. The housing 580 includes an extension portion 585 therein which contacts the second electrode 130. The extension portion 585 increases the area of contact between the housing 580 and the second electrode 130, and functions not only to allow for a stable mechanical connection between the housing 580 and the second electrode 130, but also to provide an electrical connection therebetween.

The second electrode 130 is connected to a lamp socket (not shown) to receive a drive voltage. In greater detail, when the second electrode 130 is connected to a lamp socket (not shown) to receive a drive voltage, the second electrode 130 is capacitively coupled to the first electrode 120 through the capacitor 540 mounted in the housing 580. Accordingly, in the fluorescent lamp 500, the capacitors 540 are connected in series between the lamp socket (not shown) and the first electrodes 120, such that there is no deviation between voltages applied to the fluorescent lamp(s) adjacent to the fluorescent lamp 500.

The second electrode 130 may be omitted from the fluorescent lamp 500. In particular, since the housing 580 is formed of a conductive material as described above, the housing 580 may be disposed directly surrounding the lamp tube 110. In such a configuration, the lamp socket (not shown) is connected to the outside of the housing 580 such that a drive voltage may be applied through the housing 580. Moreover, in this configuration, the capacitors 540 in the fluorescent lamp 500 are connected in series.

Figure 16:
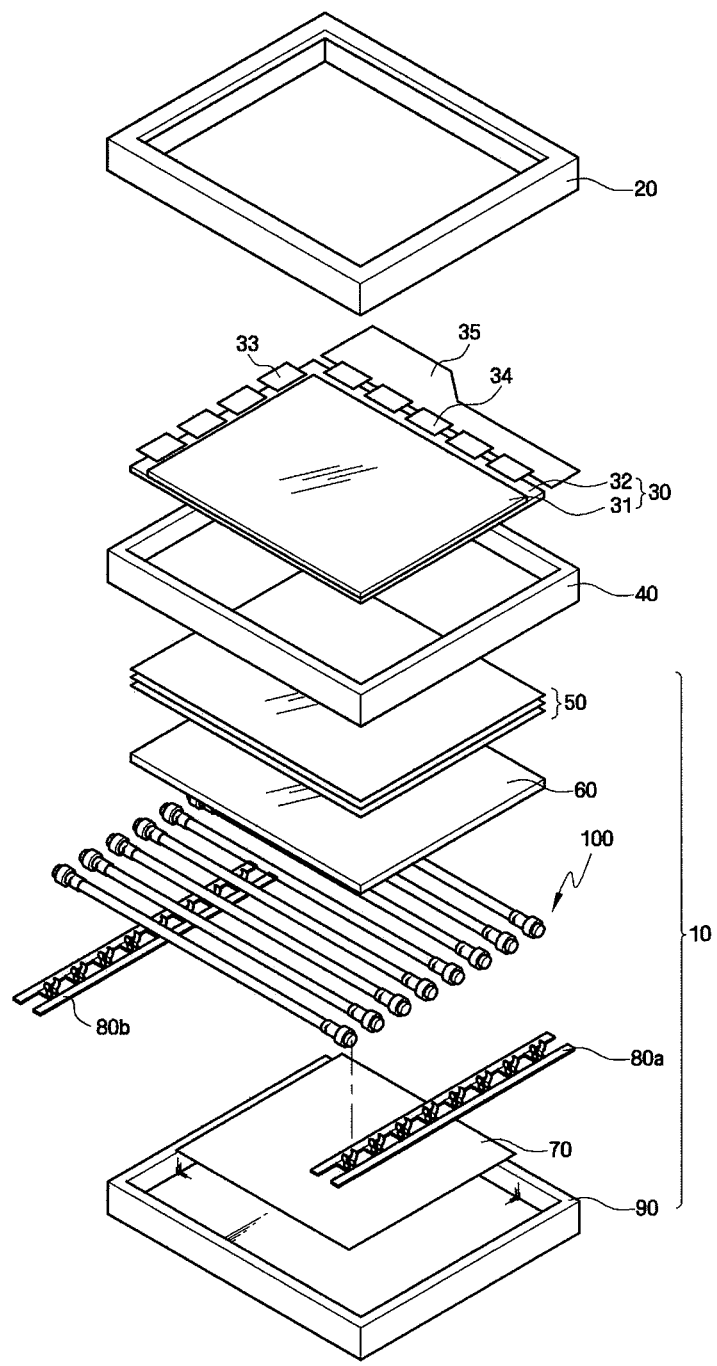
FIG. 16 is an exploded perspective view of a display device according to an exemplary embodiment of the present invention.

A display device according to an exemplary embodiment of the present invention will hereinafter be described in detail with reference to FIG. 16. FIG. 16 is an exploded perspective view of a display device according to an exemplary embodiment of the present invention.

The display device 1 according to the present exemplary embodiment includes a display panel assembly, an upper receptacle 20, and the backlight assembly 10.

The display panel assembly includes a display panel 30, a gate driver IC 33, a data driver IC 34, and an integrated printed circuit board 35. The display panel 30 includes a lower display panel 31, an upper display panel 32, and a liquid crystal layer (not shown) interposed between the lower and upper display panels 31 and 32.

The lower display panel 31 of the display panel 30 includes gate lines (not shown), data lines (not shown), a thin film transistor array, and pixel electrodes. The upper display panel 32 includes a black matrix, common electrodes, etc., and is disposed opposing the lower display panel 31. The display panel 30 functions to display image information.

The upper receptacle 20 forms an exterior of the display device 1, and defines a space for receiving the display panel assembly therein. The upper receptacle 20 is formed with an open window at a center thereof that exposes the display panel 30.

The upper receptacle 20 is connected to the lower receptacle 90. An optical sheet unit 50, a diffusion plate 60, and fluorescent lamps 100 are received between the upper receptacle 20 and the lower receptacle 90. An intermediate frame 40, which is seated on the lower receptacle 90, may be further included in the display device 1.

The backlight assembly 10 is disposed under the display panel 30 and supplies light to the same. The backlight assembly 10 includes a plurality of the fluorescent lamps 100, a plurality of lamp sockets 80a and 80b, the optical sheet unit 50, the diffusion plate 60, a reflection sheet 70, and the lower receptacle 90.

The fluorescent lamps 100 are spaced apart at equal intervals, are connected in parallel and in-phase, and may be provided in a direct-type configuration. To obtain a uniform brightness, the fluorescent lamps 100 may be arranged parallel to the long sides of the lower receptacle 90.

The optical sheet unit 50 is disposed above the diffusion plate 60. The optical sheet unit 50 diffuses and focuses light transmitted from the fluorescent lamps 100. In the present exemplary embodiment, the optical sheet unit 50 includes a diffusion sheet, a first prism sheet, and a second prism sheet. The reflection sheet 70 is disposed under the fluorescent lamps 100, and reflects light emitted downwardly from the fluorescent lamps 100 in an upward direction. The reflection sheet 70 is made of a material having a high reflectance to minimize loss of the light emitted from the fluorescent lamps 100.

The ends of each fluorescent lamp 100 are inserted into the lamp sockets 80a and 80b, and are secured in the lower receptacle 90. Each of the lamp sockets 80a and 80b may be disposed along one of the two ends of the array of fluorescent lamps 100. The lamp sockets 80a and 80b may be fixed to the lower receptacle 90.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight assembly, comprising:
a plurality of fluorescent lamps at least one of the lamps including a lamp tube having a fluorescent layer, a discharge gas contained in the lamp tube, a first electrode disposed in the lamp tube, a capacitor disposed on an end of the lamp tube, a conductive terminal capacitively coupled to the first electrode by the capacitor, a second electrode connected to the first electrode, an insulator disposed between the second electrode and the conductive terminal and protruding away from the end of the lamp tube to overlap the capacitor,
wherein the second electrode is directly disposed on an entire first surface of the capacitor, the conductive terminal is directly disposed on an entire second surface of the capacitor and the first and second surfaces are opposite each other; and
a lamp socket which secures the plurality of fluorescent lamps.

2. The backlight assembly of claim 1, wherein the second electrode surrounds the end of the lamp tube, and wherein the second electrode and the conductive terminal are capacitively coupled to each other.

3. The backlight assembly of claim 2, wherein the capacitor is disposed between the second electrode and the conductive terminal.

4. The backlight assembly of claim 1, wherein the conductive terminal surrounds the insulator.

5. The backlight assembly of claim 4, wherein the capacitor is disposed between the second electrode and the conductive terminal.

6. The backlight assembly of claim 5, wherein the first electrode, the second electrode, the capacitor, the conductive terminal and the insulator are integrally formed with each lamp and the conductive terminal is configured to be inserted into a connecting terminal of a lamp socket.

7. The backlight assembly of claim 1, wherein the conductive terminal surrounds the end of the lamp tube.

8. The backlight assembly of claim 7, wherein the capacitor is disposed between the first electrode and the conductive terminal.

9. The backlight assembly of claim 8, wherein the capacitor comprises a multilayer ceramic capacitor.

10. The backlight assembly of claim 8, further comprising a housing connected to the first electrode with the capacitor as a medium therebetween, and wherein the housing is additionally connected to the conductive terminal.

11. The backlight assembly of claim 1, wherein the conductive terminal is configured to be connected to a lamp socket to receive a drive voltage.

12. A display device, comprising:
a display panel which displays an image;
a plurality of fluorescent lamps, at least one of the lamps including a lamp tube having a fluorescent layer, a discharge gas contained in the lamp tube, a first electrode disposed in the lamp tube, a capacitor disposed on an end of the lamp tube, a conductive terminal capacitively coupled to the first electrode by the capacitor, a second electrode connected to the first electrode, an insulator disposed between the second electrode and the conductive terminal and protruding away from the end of the lamp tube to overlap the capacitor,
wherein the second electrode is directly disposed on an entire first surface of the capacitor, the conductive terminal is directly disposed on are entire second surface of the capacitor and the first and second surfaces are opposite each other; and
a lamp socket which secures the plurality of fluorescent lamps thereto.

13. The display device of claim 12, wherein the second electrode surrounds the end of the lamp tube, and wherein the second electrode and the conductive terminal are capacitively coupled to each other.

14. The display device of claim 13, wherein the capacitor is disposed between the second electrode and the conductive terminal.

15. The display device of claim 13, wherein the conductive terminal surrounds the insulator.

16. The display device of claim 15, wherein the capacitor is disposed between the second electrode and the conductive terminal.

17. The display device of claim 16, wherein the conductive terminal is inserted into a connecting terminal of the lamp socket.

18. The display device of claim 12, wherein the conductive terminal surrounds the end of the lamp tube.

19. The display device of claim 18, wherein the capacitor is connected between the first electrode and the conductive terminal.

20. The display device of claim 19, wherein the at least one lamp further comprises a housing connected to the first electrode with the capacitor as a medium therebetween, and wherein the housing is additionally connected to the conductive terminal.

21. The display device of claim 12, wherein the lamp socket secures both ends of the plurality of fluorescent lamps, and comprises first and second sockets for connecting the plurality of fluorescent lamps in parallel.

22. The display device of claim 12, wherein the conductive terminal is connected to the lamp socket to receive a drive voltage.

* * * * *